(12) United States Patent
Takahashi

(10) Patent No.: US 6,819,442 B2
(45) Date of Patent: Nov. 16, 2004

(54) CONTROLLED PRINT SIZE FOR IMAGE DATA

(75) Inventor: Kenji Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/062,973

(22) Filed: Apr. 21, 1998

(65) Prior Publication Data

US 2001/0040684 A1 Nov. 15, 2001

(30) Foreign Application Priority Data

Apr. 28, 1997 (JP) .............................................. 9-111574

(51) Int. Cl.$^7$ ...................... H04N 5/225; G06K 15/02
(52) U.S. Cl. .................... 358/1.15; 348/207.2; 348/552
(58) Field of Search ................ 358/1.1–1.9, 1.11–1.18; 396/7, 20, 25, 26, 27, 28, 29, 30, 297, 341, 348, 353, 354, 360, 429; 348/552, 207.1, 207.2

(56) References Cited

U.S. PATENT DOCUMENTS

| | | | | |
|---|---|---|---|---|
| 4,937,676 A | * | 6/1990 | Finelli et al. ................ | 358/229 |
| 5,142,594 A | * | 8/1992 | Sugishima ................... | 382/56 |
| 5,361,329 A | * | 11/1994 | Morita et al. ................ | 395/102 |
| 5,402,171 A | | 3/1995 | Tagami et al. ............... | 348/219 |
| 5,502,794 A | * | 3/1996 | Sakurai ........................ | 358/1.9 |
| 5,642,145 A | * | 6/1997 | Tanaka et al. ............... | 347/111 |
| 5,678,000 A | * | 10/1997 | Ohtani ........................ | 358/1.2 |
| 5,687,303 A | * | 11/1997 | Motamed et al. .......... | 358/1.18 |
| 5,704,019 A | * | 12/1997 | Akiyama et al. ............ | 358/1.1 |
| 5,809,345 A | * | 9/1998 | Numako ...................... | 396/48 |
| 5,867,634 A | * | 2/1999 | Hirota et al. ................ | 358/1.9 |
| 5,887,126 A | * | 3/1999 | Fujimoto .................... | 358/1.12 |
| 5,903,309 A | * | 5/1999 | Anderson .................... | 348/333 |
| 5,906,442 A | * | 5/1999 | Kishida ........................ | 400/61 |
| 5,999,661 A | * | 12/1999 | Oster et al. ................. | 382/276 |
| 6,111,605 A | * | 8/2000 | Suzuki ........................ | 348/220 |

OTHER PUBLICATIONS

US 5,892,534, 4/1999, Maruyama et al. (withdrawn)*

* cited by examiner

*Primary Examiner*—King Y. Poon
(74) *Attorney, Agent, or Firm*—Fitzpatrick, Cella, Harper & Scinto

(57) ABSTRACT

The present invention enables to ensure printing the entire desired image. An image data interpreter 21 interprets the header portion of data transmitted by a digital camera to detect the number of dots indicative of height and width of an image to be printed. A printer analyzer 22 detects the size of a print paper actually set in a printer. To perform printing in a print condition set by an output setting unit 23, image data size is adjusted based on the detected image data size and print paper size as well as the set print condition, and the adjusted image data is outputted to a printer engine.

12 Claims, 8 Drawing Sheets

FIG. 6

| SIZE | PRINTABLE RANGE |
|------|-----------------|
| A6 | 12.6 × 8.8 cm |
| A5 | ⋮ |
| A4 | ⋮ |
| E | ⋮ |
| L | ⋮ |
| ⋮ | ⋮ |

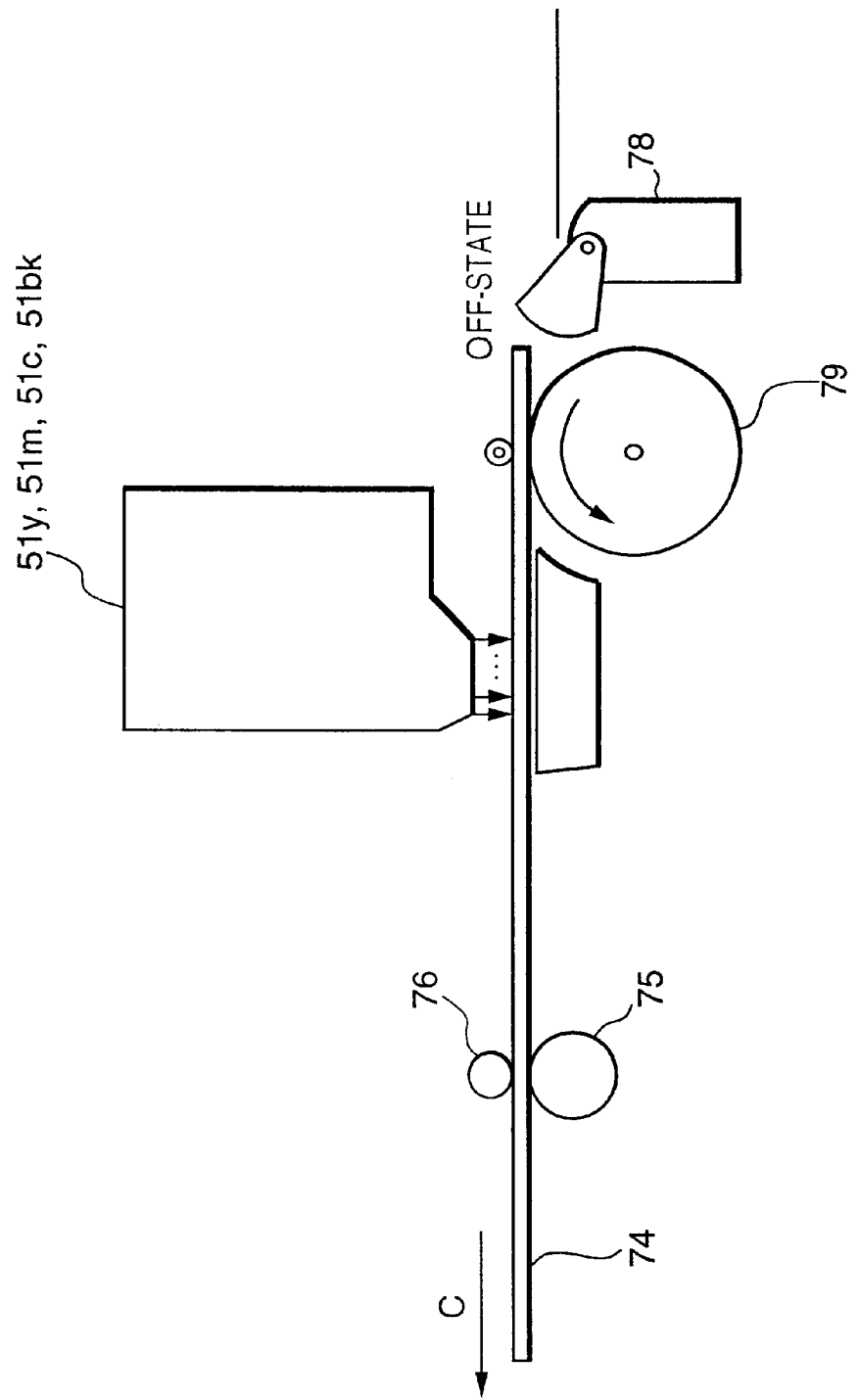

CONTROLLED PRINT SIZE FOR IMAGE DATA

BACKGROUND OF THE INVENTION

The present invention relates to a print control apparatus, print control method and a storage medium, and more particularly, to a print control apparatus and method for printing an image based on image data transmitted by an image output apparatus, and a storage medium.

In order to print an image sensed by an image sensing apparatus e.g., a digital camera or the like, by a printer, it is a general procedure to connect the image sensing apparatus to a data processing apparatus e.g., a personal computer or the like, to transfer the sensed image data to the data processing apparatus using communication means and have it print by using an application program of the data processing apparatus.

On the application program, the number of output dots (the number of pixels indicative of height and width of an image) and a size of a print paper are set. However, for instance, in a case where a print paper of A6 size (105 mm×148 mm) is set in a printer and if a user inputs an image larger than the print paper of size A6, a problem arises in that the outputted image will be partly cut off.

Even if the size of a print paper actually set in the printer is sufficiently large, when an image is enlarged to the largest size possible to be printed on the print paper, a blurred image is printed and image quality is deteriorated, although the level of deterioration depends upon the size of the original image data.

Furthermore, in a case where printing is performed via the data processing apparatus, a user must go through the trouble of operating the data processing apparatus, and must learn how to operate the application program.

SUMMARY OF THE INVENTION

The present invention has been made in consideration of the above situation, and has as its object to provide a print control apparatus, print control method and a storage medium which enable to ensure printing the entire desired image.

In order to solve the above-described problems, the print control apparatus according to the present invention has the following configuration.

More specifically, the present invention provides a print control apparatus for controlling print means which enables to print image data, maintained in an image output apparatus, on a print medium, comprising: first means for detecting a size of the image data maintained in the image output apparatus; second means for detecting a size of the print medium on which an image is to be printed by the print means; setting means for manually setting a print condition; and adjusting means for adjusting the size of the image data conforming to the print condition manually set by the setting means, based on the sizes obtained by the first and second means respectively.

Furthermore, another object of the present invention is to provide a print control apparatus which enables to print an image while controlling a setting that causes image quality deterioration.

In order to attain the above objects, the aforementioned adjusting means includes: determination means for determining whether or not a size of the image, complying with the size of the image data detected by the first means and the print condition set by the setting means, is within the size of the print medium, wherein in a case where the determination means determines that the size of the image is within the size of the print medium, the image is printed in the determined size, while in a case where the determination means determines that the size of the image exceeds the size of the print medium, the size of the print medium detected by the second means is set again as a print-permitted area and the size of the image data is adjusted again.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

Figure 6:
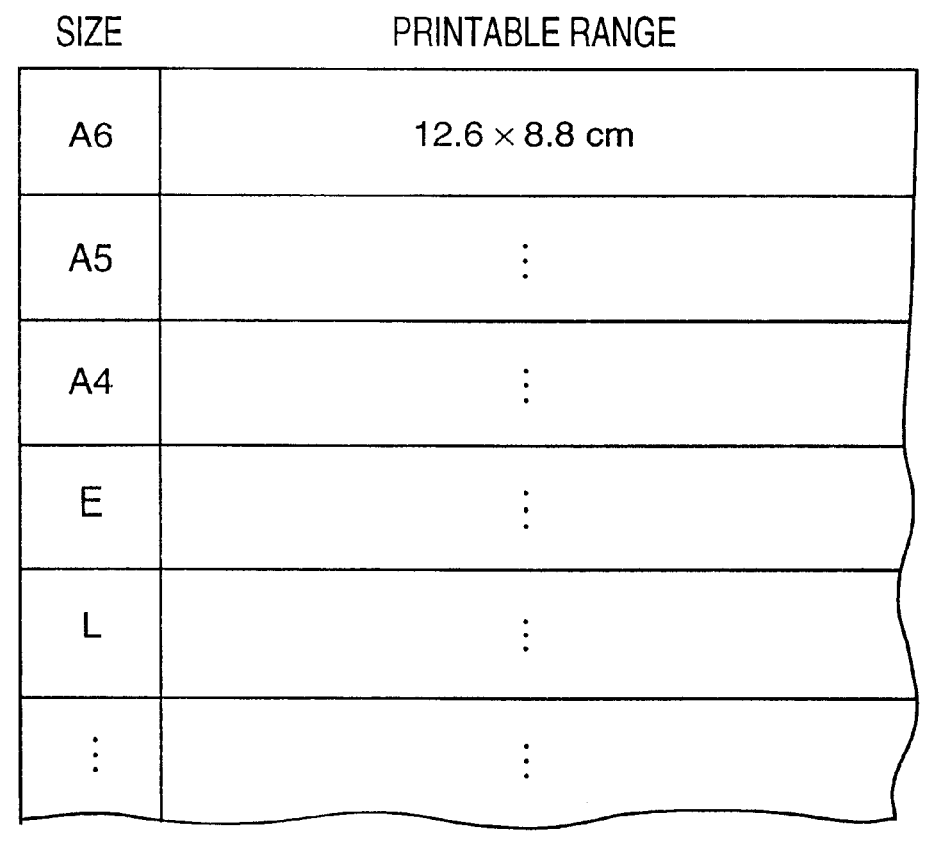

FIG. 6 is a table showing the relation between a print medium size and a printable range according to the present embodiment;

FIG. 8 is a schematic view of a printer unit of the printing apparatus according to the present embodiment.

DETAILED DESCRIPTION OF THE PREFERRED EMBODIMENTS

Preferred embodiments of the present invention will be described in detail in accordance with the accompanying drawings.

<First Embodiment>
<Description of Apparatus Construction>

Figure 1:
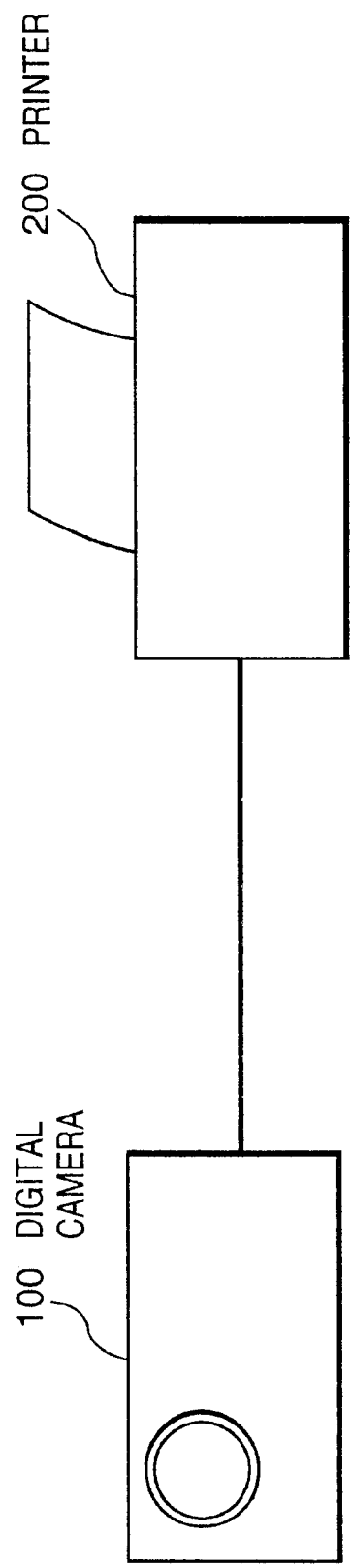
FIG. 1 is an explanatory view showing a system construction according to the present embodiment.
Figure 2:
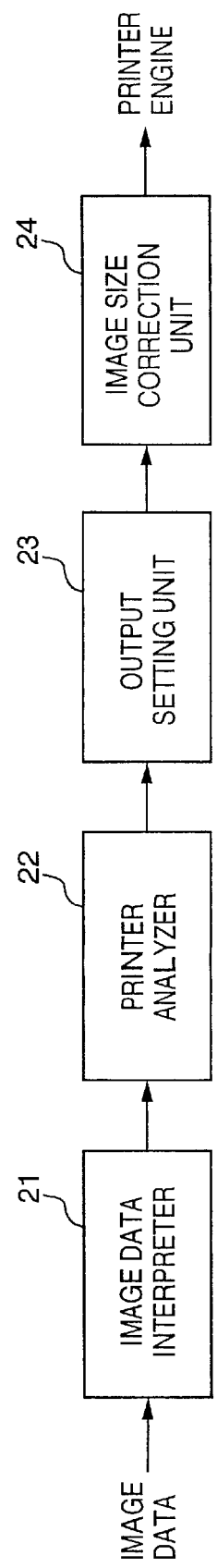
FIG. 2 is a block diagram showing processing flow of a printing apparatus according to the present embodiment.

FIG. 1 shows a system construction according to the present embodiment, and FIG. 2 is a block diagram showing construction of the printing apparatus according to the present embodiment.

Referring to FIG. 1 showing the brief construction of the present invention, reference numeral 100 denotes a digital camera; and 200, a printer used in the present embodiment. The printer 200 is capable of switching its printing resolution between 144 dpi and 288 dpi, and employs a color ink-jet printing method as the printing method. In a case of using a printhead having a large number of ink discharge orifices (printhead is provided for each color component), switching the resolution in the main-scanning direction is realized by controlling the moving speed of the printhead, while switching the resolution in the sub-scanning direction is realized by performing printing by either driving all the ink discharge orifices or alternate ink discharge orifices.

However, the method of switching resolution is not limited to this method, but may employ any means.

FIG. 2 is a block diagram showing processing function of the printer 200.

Hereinafter, processing of the present invention will be described with reference to FIGS. 1 and 2.

Note that when image data sensed by the digital camera 100 (hereinafter referred to as image data) subjected to printing is transferred to a printer, the digital camera 100 used in the present embodiment transfers header data, including the number of pixels indicative of height and width of an image (hereinafter referred to as image data size), and then transfers actual image data. The header data includes commands for indicating the header and information indicating the number of pixels in the horizontal and vertical directions and the number of bits in one pixel. For example, header data is command (1 byte)+number of vertical dots (2 bytes)+number of horizontal dots (2 bytes)+number of bits for R, G and B of one pixel (1 byte).

Referring to FIG. 2, an image data interpreter 21 interprets the header data transferred by the digital camera 100 and detects the image data size subjected to printing. Then, in a printer analyzer 22, printer state data (including print paper size) at that point of time is detected. An output setting unit 23 enables an operator to manually perform output setting based on the image data size and print paper size.

According to the contents set in the output setting unit 23, the inputted image data is corrected and outputted to a printer engine (ink-jet printer in the present embodiment) for printing an image.

Processing performed by the output setting unit 23 according to the present embodiment will be described next.

In the output setting unit 23, two modes can be set: "resolution designation mode" and "size designation mode." A user can select either one of the modes. The mode selection is performed by using a display unit comprising a liquid crystal or the like provided in the printer 200 and a switch group provided for selection. For instance, operating a selection switch changes the mode, and further operating a confirm switch allows detailed setting of each mode. Hereinafter, each mode will be described.

<Resolution Designation Mode>

The resolution designation mode basically allows to select print resolution, i.e. either 144 dpi or 288 dpi.

For instance, in a case where an image data size subjected to printing is 640×480 dots and a print paper of A6 size is detected (assuming herein that a printable range of A6 paper is 12.6 cm×8.8 cm), if a user selects 144 dpi, the size of an output image is 11.3 cm×8.5 cm; while if a user selects 288 dpi, the size of an output image is 5.6 cm×4.2 cm. Since these sizes are both within the printable range of the A6 print paper, the apparatus detects no problem and print processing is performed.

Meanwhile, in a case where the image data size is 1920×1440 dots, if a user selects 144 dpi, the size of an output image is 33.8 cm×25.4 cm; while if a user selects 288 dpi, the size of an output image is 16.9 cm×12.7 cm. Without processing, these output images cannot be printed on the A6 print paper. To cope with this situation, the present embodiment reduces (thinning processing) the image data to 662× 496 dots in the case of 144 dpi, and to 1334×996 dots in the case of 288 dpi, so as to obtain an output image size of 11.7 cm×8.8 cm, which can be printed in the A6 print paper.

Note that the size of the output image is 11.7 cm×8.8 cm although the printable range of the A6 print paper is 12.6 cm×8.8 cm because of the purpose to maintain the picture ratio (aspect ratio) of the image data (details will be explained in the description of the size designation mode).

<Size Designation Mode>

The size designation mode is now described. The size designation mode according to the present embodiment allows a user to select an output size from templates whose sizes are provided in advance. The templates are stored in a predetermined memory (ROM).

The templates include size E (11.6 cm×8.2 cm), size L (12.6 cm×8.8 cm), size 2L (17.8 cm×13.5 cm) and a full size which are used in a silver chloride photograph or the like. Each size has two patterns for 144 dpi and 288 dpi (thus, there are eight types of templates). Herein, the "full size" is the mode in which the entire image is printed as large as possible in the printable range of a print paper set in the printer.

Note that the aspect ratios of the size E, size L, size 2L and full size do not always coincide with the aspect ratio of image data. Processing performed in these cases will be described below.

It is assumed herein that the image data size is Xi (horizontal)×Yi (vertical), and the size of an output template is Xt (horizontal)×Yt (vertical). An aspect ratio Xi/Yi of the image data and an aspect ratio Xt/Yt of the template are obtained first. Then, the aspect ratio of the image data is compared with the aspect ratio of the template. In a case where the aspect ratio of the image data is larger than the aspect ratio of the template, a magnification value M is obtained so as to satisfy Xt=M×Xi. In a case where the aspect ratio of the image data is smaller than the aspect ratio of the template, a magnification value M is obtained so as to satisfy Yt=M×Yi. Using the value M, the number of horizontal and vertical dots in the image data are respectively multiplied by M (interpolated or thinned out).

Figure 3A:
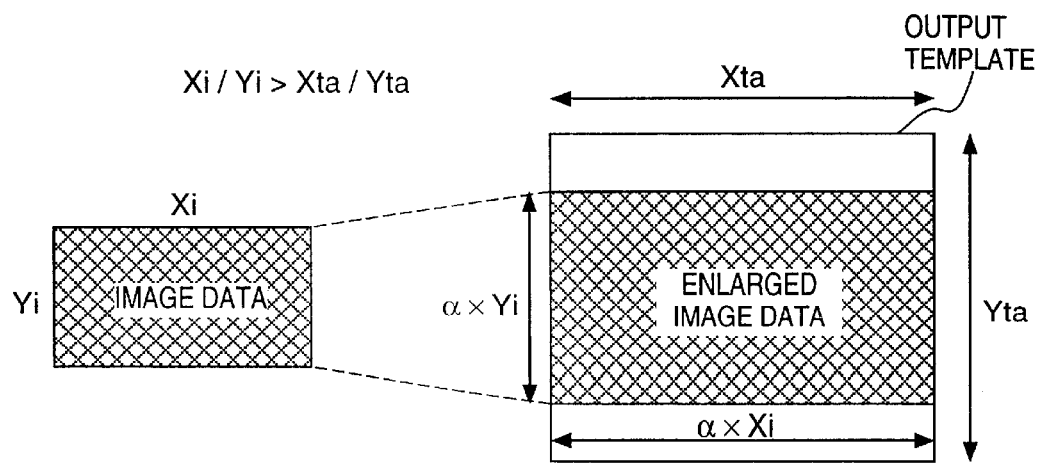
FIGS. 3A and 3B are explanatory views for explaining the method of determining a magnification of image data according to the present embodiment.
Figure 3B:
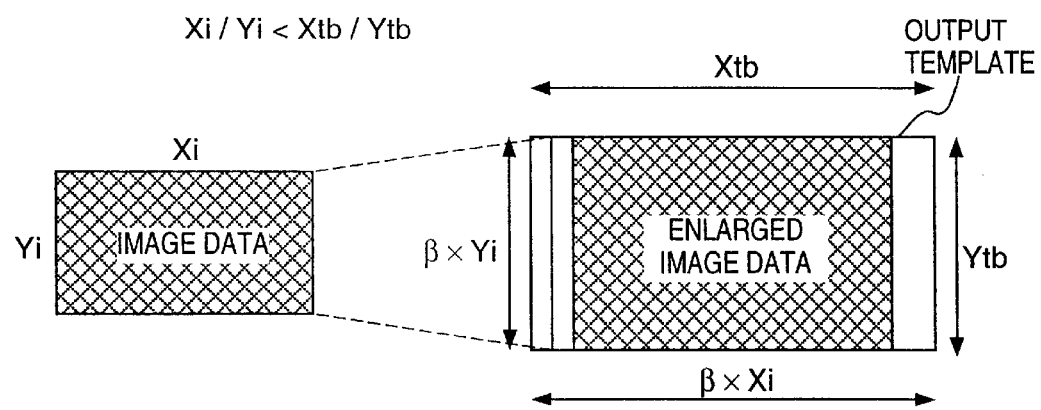

The above processing will be described with reference to FIGS. 3A and 3B. In the case of FIG. 3A, Xi/Yi>Xta/Yta. To print an image in the largest size possible in the printable range of the template, while maintaining the aspect ratio, the number of horizontal and vertical dots in the image data are respectively multiplied by α so as to satisfy Xta=α×Xi. In the case of FIG. 3B, Xi/Yi<Xtb/Ytb. The number of horizontal and vertical dots in the image data are respectively multiplied by β so as to satisfy Ytb=β×Yi.

As described above, the magnification rate for enlargement/reduction is determined based on the output size set by a user, then reduction or enlargement of image data is performed by an image size correction unit 24.

Note that in a case where the size of a print paper actually set in the printer is A6 (printable range is 12.6 cm×8.8 cm), size 2L is not included in the selectable sizes of print paper. The reason is that, if the size 2L is designated, the image is enlarged to a size larger than the 2L print paper and the entire image cannot be printed. In other words, when A6 print paper is detected, the selectable sizes of print paper are E, L or full size. Thus, the list of selectable sizes of print paper is displayed on the screen of an operation unit.

Herein, description will be provided in a case where inputted image data has 640×480 dots, a detected print paper is size A6, and a selected template is size E (288 dpi) (11.6 cm×8.2 cm). If the image data of 640×480 dots is printed at 288 dpi without processing, the outputted image will have a size of 5.6 cm×4.2 cm. Therefore, a magnification rate is determined in the manner described above and image data is interpolated using the determined magnification rate to increase the number of pixels, and printing is performed accordingly.

Furthermore, in a case where inputted image data is 1920×1440 dots and a detected print paper is size A6, and a selected template is size E (288 dpi), a magnification rate less than 1 is used to thin out the image data, then printing is performed.

According to the resolution designation mode in the present embodiment, when printing is to be performed at designated resolution, if an image size to be outputted is within a printable range of the print paper actually set, the inputted image data is printed without further processing. However if it is determined that the image size to be outputted exceeds the print paper size, thinning processing or the like is performed and printing is performed at the selected resolution. Moreover, in the size designation mode, since a user can select from a list of selectable sizes displayed on the screen of the operation unit, only the template having a size smaller than the size of the actually set print paper, an image having a desired size can be obtained within the selectable sizes. Particularly in a case where a user selects a full size, the rate of interpolation or thinning-out processing is automatically determined in accordance with the size of a print paper set in the printer. Therefore, a user does not need the knowledge of size A6 or size E and so forth.

The specific configuration of the apparatus will be described with reference to FIG. 4.

Figure 4:
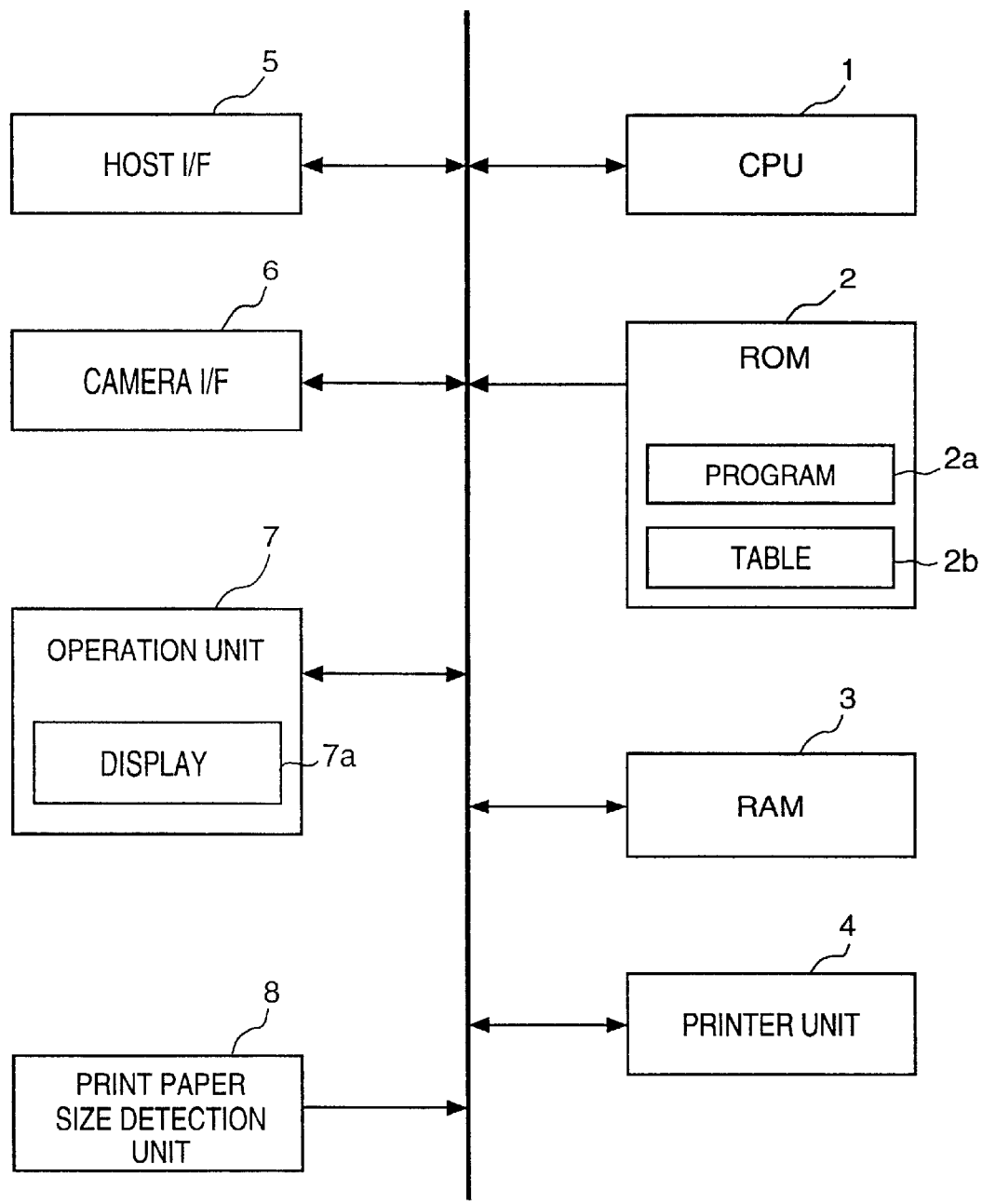
FIG. 4 is a block diagram showing specific construction of the printing apparatus according to the present embodiment.

In FIG. 4, reference numeral 1 denotes a CPU for controlling the entire printing apparatus; and 2, a ROM. The ROM includes a program area 2a for storing programs (including programs corresponding to the flowchart in FIG. 5 to be described later) serving as the operation processing steps of the CPU 1, and a table area 2b. In the table area 2b, a table shown in FIG. 6 which will be described later and other various templates are stored. Since the printer of the present embodiment also performs printing of print data sent by general host computers, the ROM 2 also includes font data or the like and programs for interpreting print data and developing into bit map data.

Reference numeral 3 denotes a RAM used as a work area of the CPU 1 or used for developing printing image data; 4, a printer unit (printer engine unit) for performing actual printing; 5, an interface unit for connecting a host computer; 6, an interface unit for connecting a digital camera; and 7, an operation unit including a display 7a for displaying a simple message or the like, and having various switches (or buttons).

Reference numeral 8 denotes a detection unit for detecting the size of the print paper by detecting a type of print paper cassette.

Figure 7:
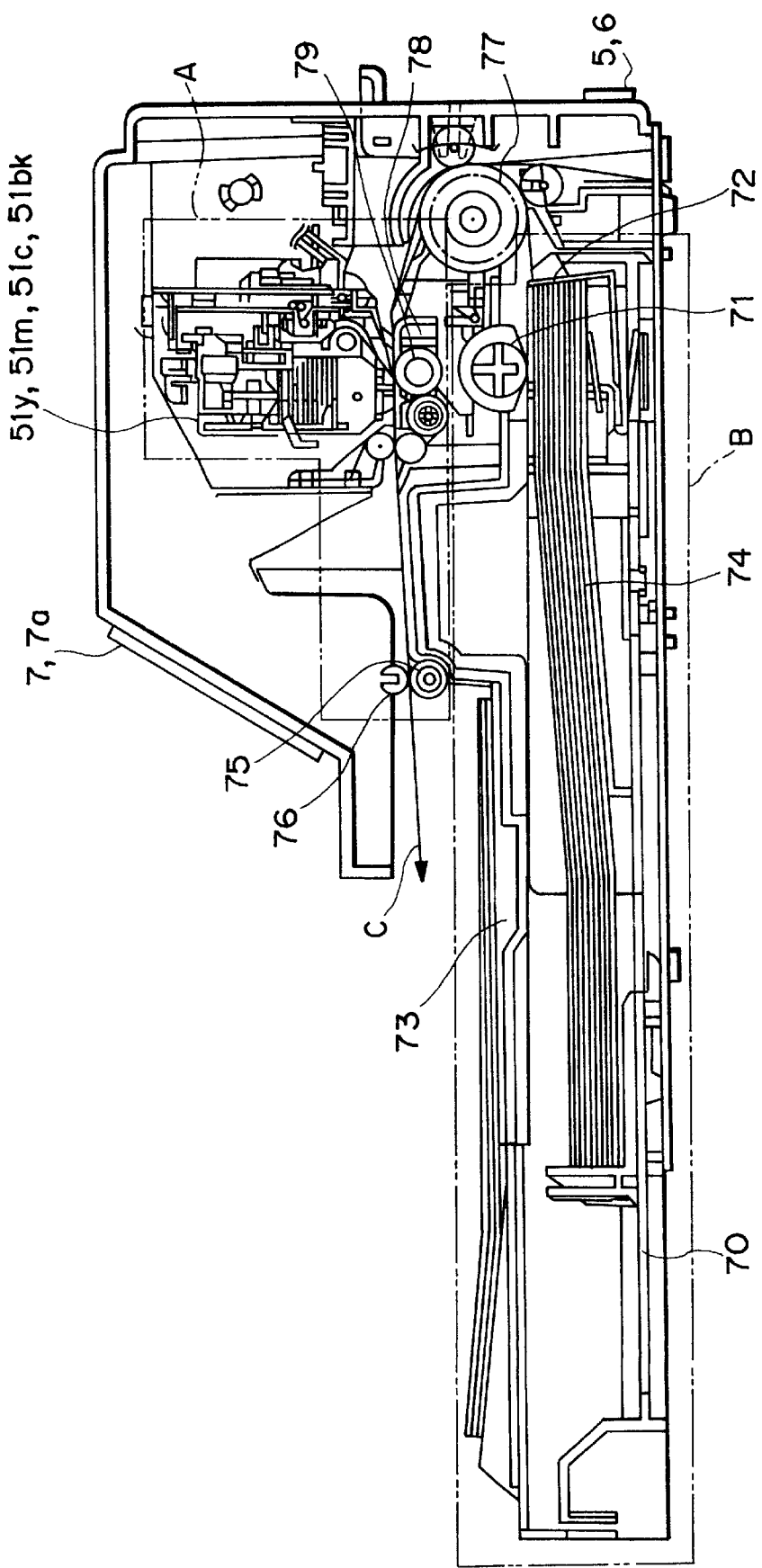
FIG. 7 is a cross-section showing the structure of the printing apparatus according to the present embodiment.

The cross section of the printing apparatus according to the present embodiment is shown in FIG. 7. Referring to FIG. 7, reference letter A denotes a printer unit for printing an image on a print paper, comprising four colors of ink-jet heads 51y, 51m, 51c and 51bk, respectively corresponding to yellow, magenta, cyan and black. Note that each of the printheads incorporating an ink tank is exchangeable. Reference letter B denotes a paper feed-out unit for feeding cut-sheet-type print papers stacked in a cassette by separating the print papers one by one.

The printing apparatus having the configuration shown in FIG. 7 performs printing on a print medium in the following manner.

A print paper 74 stacked in a cassette 70 is picked up by a paper feed roller 71 and separation claw 72, conveyed by a conveyance roller 77 and fed into the printer unit A. In the printer unit A, the printheads 51y, 51m, 51c and 51bk are reciprocally scanned perpendicularly to the print paper surface, and printing is performed by discharging ink onto the print paper. The moving direction of the printhead 51 (51y, 51m, 51c and 51bk) is referred to as a main-scanning direction.

Each time single scan of printing is performed, the print paper 74 is conveyed for a width corresponding to the single scan of the printheads 51y, 51m, 51c and 51bk, in the direction indicated by an arrow C in FIG. 7. Printing operation proceeds in this manner until printing on the print paper 74 is completed. Then, the print paper 74 is discharged by print paper discharge rollers 75 and 76 made of rubber or the like, to a stacker 73 and stacked thereon.

Furthermore, in FIG. 7, reference numeral 79 denotes a conveyance roller; and 78, a print paper sensor for detecting an edge of a print paper. Although not shown in the drawing, the cassette 70 has a number of types, each capable of storing different sizes of print paper. Also the cassette 70 has a projected portion (not shown) for enabling to detect the type of the cassette (size of print paper set in the printer). The projected portion is optically detected by the print paper size detection unit 8. Note that means for detecting a print paper size is not limited to this method, but may be detected by any other means.

FIG. 8 is a schematic view of the peripheral structure of the printheads 51y, 51m, 51c and 51bk in the printer unit A shown in FIG. 7.

Although the following description is given regarding printhead 51y only, the description applies to other printheads 51m, 51c and 51bk as well. The printhead 51y includes 64 nozzles arrayed in the print paper conveyance direction (sub-scanning direction) indicated by the arrow C. By the pressure of film boiling generated in ink, which is caused by heat generated by electrothermal transducers provided in each nozzle, an ink droplet is discharged by an orifice of the nozzle end.

The conveyance roller 79 conveys the print paper in the sub-scanning direction at the time of feeding the print paper 74, printing on the print paper 74, or discharging the print paper, with the precision corresponding to print resolution of the printheads 51y, 51m, 51c and 51bk.

FIG. 8 shows the state where the print paper 74, being conveyed in the sub-scanning direction by the conveyance roller 79, is outside the detection area (area indicated by hatching) of the print paper sensor 78. In such state, the print paper sensor 78 is turned OFF. Meanwhile, when the print paper 74 conveyed on the conveyance path is within the detection area of the print paper sensor 78, the print paper sensor 78 is turned ON. Therefore, by the ON/OFF state of the print paper sensor 78, it is possible to detect the followings:

(1) whether or not the print paper is near the printhead 51;
(2) whether or not the beginning edge of the print paper 74 is near the printhead 51; and
(3) whether or not the ending edge of the print paper 74 is near the printhead 51.

Figure 5:
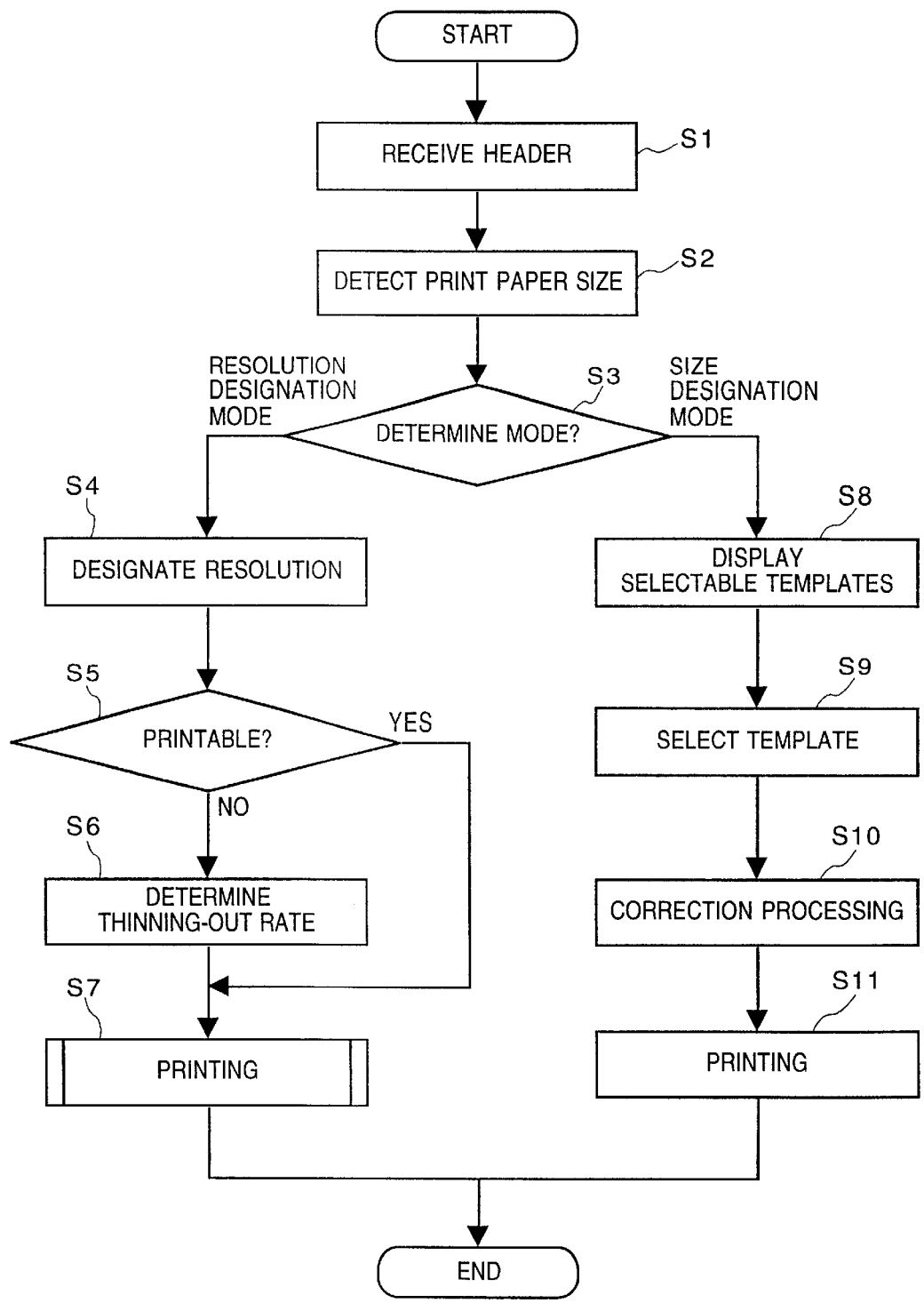
FIG. 5 is a flowchart showing steps of operation processing of the printing apparatus according to the present embodiment.

Description will be provided with reference to the flowchart in FIG. 5, showing operation processing performed when a user sets a mode in the operation unit 7 for printing an image sensed by a digital camera. Herein, it is assumed that the digital camera 100 and printer 200 are connected via an interface unit 80. Note that the processing for performing printing based on data sent by a host computer or the like, that is, the processing of the normal printer function, will not be described herein.

In step S1, the printer awaits for receiving header data (including the number of pixels indicative of height and width of an image) from the digital camera 100. In this stage, an operator selects an image to be printed in the digital camera 100 and sends print instruction. When the print instruction is sent by the digital camera, header data of the image, subjected to printing, is first sent to the printer. The printer receives the header data.

Next, based on signals sent by the print paper size detection unit 8, the size of a print paper being set in the printer is determined. Based on the signals, a printable range of the detected print paper is obtained from a table 26 shown in FIG. 6.

Then, the processing proceeds to step S3, where an inquiry message is displayed on the display 7a of the operation unit 7, requesting the desired mode: the resolution designation mode or size designation mode, and one of the modes is selected. If the resolution designation mode is selected, the processing proceeds to step S4, while if the size designation mode is selected, the processing proceeds to step S8.

The processing in the resolution designation mode is now described.

In step S4, a desired printing resolution i.e., 144 dpi or 288 dpi, is set, and determination is made as to whether or not the size of the image printed at the desired resolution falls within the printable range of the print paper obtained in step S2.

If determination is made that the size of the image falls within the printable range, step S6 is skipped and the inputted image data is outputted at the designated resolution in step S7.

If determination is made that the size of the image exceeds the printable range, the processing proceeds to step S6 to perform correction processing because if the image is printed without correction, only a part of the inputted image would be printed. In the correction processing, a thinning-out rate to maintain the aspect ratio of the image is determined.

The processing then proceeds to step S7 where image data is actually received, well-known binarization processing is performed, and printing is performed. Note that in a case where step S6 is skipped, printing is performed without thinning out the print data, whereas in a case of performing the processing in step S6, thinning processing is performed at the thinning-out rate determined therein and printing is performed.

Meanwhile, in a case where the size designation mode is selected, the templates are narrowed down to candidates of selectable templates based on the image data size (the number of pixels indicative of height and width of an image) known at that time and the printable range of a print paper actually set in the printer, and the narrowed-down templates are displayed on the display 7a (step S8) for a user to select one (step S9).

Next, the processing proceeds to step S10 where a magnification (interpolation rate or thinning-out rate) is determined in accordance with the selected template, then proceeds to step S11 where the image data is received and converted based on the determined magnification and printing is performed.

<Second Embodiment>

An image sensed by a widely available digital camera generally has 640×480 dots in conformity to the VGA standard. For instance, in a case where image data having 640×480 dots is printed in a printable range (assuming 28 cm×19 cm) of an A4 print paper at resolution of 288 dpi, it is necessary to generate image data having more than 3100×2100 dots. In other words, the rate of magnification for the horizontal and vertical dots is nearly five times. However, if original image data is enlarged by far more than necessary and printed, image quality is deteriorated. Therefore, enlarging image data with a great magnification rate is not preferable.

In view of this, a permissible magnification limit is set in the second embodiment. In a case of exceeding the range of the permissible limit, the image data is printed at the magnification limit, but if the magnification does not exceed the permissible limit, a calculated magnification is employed. The specific operation will be described below.

Since the construction of the second embodiment is the same as that of the first embodiment, description will be given using the same drawings. In a case of outputting an image in full size, assuming that an image size of image data outputted at 288 dpi is $X_i$ (horizontal)×$Y_i$ (vertical), and a printable range of a print medium is $X_t$×$Y_t$, a magnification M for the image data can be obtained by the following equation as explained in the first embodiment.

If $X_i/Y_i > X_t/Y_t$, $M = X_t/X_i$

If $X_i/Y_i < X_t/Y_t$, $M = X_t/Y_i$

The value of magnification M obtained by the above equation is compared to a magnification limit $M_t$ for 288 dpi, which is the permissible magnification for permissible image quality deterioration due to blur. If $M_t > M$ is satisfied, the magnification is set to M, while if $M_t < M$ is satisfied, the magnification is set to $M_t$. Upon determining the magnification, magnification processing is performed on the image data and sent to the printer.

Note that in the second embodiment, the magnification limit is provided for each print resolution. For instance, the maximum magnification rate for printing at 144 dpi is set to three, and the maximum magnification rate for printing at 288 dpi is set to four. These magnification limits are stored in the ROM 2. The reason that the magnification limit is set low in a case of printing at low resolution is because coarseness in the printed image becomes conspicuous.

Since other processing is the same as those of the first embodiment, description thereof will be omitted.

Note that although CCD elements included in the digital camera are capable of sensing an image of 640×480 dots, there is a digital camera lately available which increases the number of pixels by interpolation, separately from the physical resolution, and creates an image as if it is sensed by a CCD capable of sensing a larger number of pixels. This is realized by, for instance, calculating a mean value of two pixels and obtaining an intermediate pixel of the two pixels, or by increasing resolution by using a high technique e.g., so-called pixel shifting or the like. The technique of pixel shifting is disclosed in U.S. Pat. No. 5,402,171 for example. Setting aside the latter technique e.g., pixel shifting or the like, the former technique is equivalent to performing interpolation in the printer. Thus, the magnification limit may be determined while taking also into consideration of the interpolation processing. For this, the type of digital camera being connected must be found out. The type of digital camera is inquired via communication, or a user sets the type of camera by operating the operation unit 7.

Note that although the size of a print paper set in the printer is detected by the sensor according to the first and second embodiments, it may be set by a user operating the operation unit although this adds an extra work to the user.

Furthermore, in the first and second embodiments, although print conditions are first set in the printer and then image data is received and printing is performed, if the printer has a memory capacity large enough to store both print conditions and image data, the print conditions may be set after image data is received.

<Other Embodiments>

In the above-described first and second embodiments, although an example has been given where various operations are performed at the printer side, these may be performed at the digital camera side.

An advantage of performing such operations at the digital camera side is that a display portion, provided in an ordinary digital camera for displaying a sensed image, can be utilized as the operation unit described in the first and second embodiments. It is desirable in this case that the digital camera has functions for setting various commands (resolution or the like) for any printer connected via communication. In other words, all the operations are performed at the digital camera side. This can be readily realized by providing the digital camera with the functions described in the first and second embodiments.

Moreover, a data processing apparatus such as a personal computer or the like may be provided between the digital camera and printer. In this case, units corresponding to the image data interpreter 21, printer analyzer 22, output setting unit 23 and image size correction unit 24 in FIG. 1 are realized by application programs operated in the data processing apparatus. In order to perform processing corresponding to that of the printer analyzer 22, the data processing apparatus is connected with the printer apparatus via two-way communication interface, and a function is provided for transmitting a command inquiring the printer which size of print paper is set.

Accordingly, it is to be understood that the present invention can be attained by supplying a system or an apparatus with a storage medium, storing program codes of software which realizes the functions described in the above embodiments, reading the program codes stored in the storage medium by a computer (e.g., CPU or MPU) of the system or apparatus and executing the program codes.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

Although the print conditions available for manual setting are either resolution setting or size setting in the above-described embodiments, other setting may be provided, e.g., setting of magnification, image cutting such as trimming or the like. In short, anything related to the size of the image subjected to printing, which can be set by manual operation, may be set.

As has been described above, according to the present invention, it is possible to ensure printing the entire desired image.

In addition to the above effect, according to the present invention, it is possible to print an image while controlling a setting that causes image quality deterioration.

The present invention is not limited to the above embodiments and various changes and modifications can be made within the spirit and scope of the present invention. Therefore, to appraise the public of the scope of the present invention, the following claims are made.

What is claimed is:

1. A digital camera comprising:
    an interface unit used for communicating with a printer directly;
    a recognition unit which recognizes a size of a print medium set for use in the printer;
    a memory which stores image data;
    an output unit which outputs image data stored in said memory to the printer via said interface unit; and
    a designation unit which determines selectable print sizes from predetermined print sizes by excluding, from the predetermined print sizes, print sizes exceeding the size of print medium recognized by said recognition unit, and allows a user to designate a print size only among the determined selectable print sizes for image data to be printed.

2. The digital camera according to claim 1, wherein said recognition unit recognizes the size of the print medium by requesting information from the printer via said interface unit.

3. The digital camera according to claim 1, wherein said recognition unit recognizes the size of the print medium by receiving an instruction from a predetermined operation unit.

4. A digital camera comprising:
    an interface unit used for communicating with a printer directly;
    a recognition unit which recognizes a size of a print medium set for use in the printer;
    a memory which stores image data;
    an output unit which outputs image data stored in said memory to the printer via said interface unit; and
    a selection unit which determines selectable print sizes from predetermined print sizes by excluding, from the predetermined print sizes, print sizes exceeding the size of the print medium recognized by said recognition unit, and allows a user to select a print size only among the determined selectable print sizes for image data to be printed.

5. A method for controlling printing of image data from a digital camera comprising the steps of:
    communicating with a printer directly via an interface;
    recognizing a size of a print medium set for use in the printer;
    storing image data in a memory;
    outputting the stored image data from the memory to the printer via the interface; and
    determining selectable print sizes from predetermined print sizes by excluding, from the predetermined print sizes, print sizes which exceed the size of the print medium recognized in said recognizing step, and allowing a user to designate a print size only among the determined selectable print sizes for image data to be printed.

6. The method according to claim 5, wherein the size of the print medium is recognized by requesting information from the printer via said interface.

7. The method according to claim 5, wherein the size of the print medium is recognized by receiving an instruction from a predetermined operation unit.

8. A method for controlling printing of image data from a digital camera comprising the steps of:

communicating with a printer directly via an interface;

recognizing a size of a print medium set for use in the printer;

storing image data in a memory;

outputting image data stored in said memory to the printer via said interface; and determining selectable print sizes from predetermined print sizes by excluding, from the predetermined print sizes, print sizes exceeding the size of the print medium recognized in recognizing step, and allowing a user to select a print size only among the determined selectable print sizes for image data to be printed.

9. A computer-readable medium which stores computer-executable process steps to control printing of image data from a digital camera, the computer-executable process steps comprising the steps of:

communicating with a printer directly via an interface;

recognizing a size of a print medium set for use in the printer;

storing image data in a memory;

outputting the stored image data from the memory to the printer via the interface; and determining selectable print sizes from predetermined print sizes by excluding, from the predetermined print sizes, print sizes which exceed the size of the print medium recognized in said recognizing step, and allowing a user to designate a print size only among the determined selectable print sizes for image data to be printed.

10. The computer-readable medium according to claim 9, wherein the size of the print medium is recognized by requesting information from the printer via said interface.

11. The computer-readable medium according to claim 9, wherein the size of the print medium is recognized by receiving an instruction from a predetermined operation unit.

12. A computer-readable medium which stores computer-executable process steps to control printing of image data from a digital camera, the computer-executable process steps comprising the steps of:

communicating with a printer directly via an interface;

recognizing a size of a print medium set for use in the printer;

storing image data in a memory;

outputting image data stored in said memory to the printer via said interface; and determining selectable print sizes from predetermined print sizes by excluding, from the predetermined print sizes, print sizes exceeding the size of the print medium recognized in recognizing step, and allowing a user to select a print size only among the determined selectable print sizes for image data to be printed.

* * * * *

UNITED STATES PATENT AND TRADEMARK OFFICE
CERTIFICATE OF CORRECTION

PATENT NO.     : 6,819,442 B2
DATED          : November 16, 2004
INVENTOR(S)    : Takahashi It is certified that error appears in the above-identified patent and that said Letters Patent is hereby corrected as shown below:

Title page,
Before [21], insert:
-- This patent issued on a continued prosecution application filed under 37 CFR 1.53(d), and is subject to the twenty year patent term provisions of 35 U.S.C. 154(a)(2). --

Column 6,
Line 43, "followings:" should read -- following --.

Column 8,
Line 56, "an" should be deleted.

Column 9,
Line 22, "inquiring" should read -- inquiring of --

Signed and Sealed this

Twenty-second Day of March, 2005

JON W. DUDAS
*Director of the United States Patent and Trademark Office*